United States Patent [19]

Gawne et al.

[11] Patent Number: 5,420,787
[45] Date of Patent: May 30, 1995

[54] SYSTEM AND METHOD FOR SEPARATING A MULTI-UNIT SIGNAL INTO SINGLE-UNIT SIGNALS

[75] Inventors: Timothy J. Gawne, Silver Spring; Barry J. Richmond, Bethesda, both of Md.

[73] Assignee: The United States of America as represented by the Secretary of the Department of Human Services, Washington, D.C.

[21] Appl. No.: 966,244

[22] Filed: Oct. 26, 1992

[51] Int. Cl.⁶ .................. G06F 15/38; G06K 9/62
[52] U.S. Cl. ...................... 364/413.05; 382/207
[58] Field of Search ............ 364/413.01, 413.05; 128/731; 382/6, 30, 29, 36

[56] References Cited

U.S. PATENT DOCUMENTS

| | | | |
|---|---|---|---|
| 4,275,743 | 6/1981 | Hjort | 128/731 |
| 4,416,288 | 11/1983 | Freeman | 128/731 |
| 4,603,703 | 8/1986 | McGill et al. | 128/731 |
| 4,611,284 | 9/1986 | McGill et al. | 364/417 |
| 4,919,143 | 4/1990 | Ayers | 128/732 |
| 4,977,504 | 12/1990 | Funahashi | 364/413.13 |
| 4,984,159 | 1/1991 | Gullberg | 364/413.16 |
| 5,029,082 | 7/1991 | Shen et al. | 364/413.16 |
| 5,067,163 | 11/1991 | Adachi | 382/6 |
| 5,073,963 | 12/1991 | Sammonds et al. | 382/30 |
| 5,092,343 | 3/1992 | Spitzer et al. | 128/733 |
| 5,204,371 | 11/1993 | Miljanich et al. | 436/503 |
| 5,262,968 | 11/1993 | Coffield | 364/604 |
| 5,263,097 | 11/1993 | Katz et al. | 392/43 |
| 5,263,120 | 11/1993 | Bickel | 395/11 |

OTHER PUBLICATIONS

Abeles, Moshe, and Goldstein, Moise H. Jr., "Multispike Train Analysis", *Proc. IEEE*, vol. 65, pp. 762-773 (1977).

Brainware, Discovery User's Guide ver. 2.2, Apr. 1990.

Yang, Xiaowei and Shamma, Shihab A., "A Totally Automated System for the Detection and Classification of Neural Spikes", *IEEE Trans. Biomed. Eng.*, vol. BME-35, pp. 806-816 (1988).

Bhissar, Ehud, The Weizmann Institute of Science, Rehovot, Israel.

SPS 8701 Waveform Discriminator Manual, 2d Ed. (1991).

Mahler, Y. et al., "Analogue Counter Integrator for Brain-Cell Unit Activity Counting", *Med. & Biol. Eng.* 14, pp. 51-54 (1976).

Zalud, P. et al., "A 4-Parameter Discriminator of Neuronal Spike Activity", *Med. & Biol. Eng.* 14, pp. 636-643 (1976).

Atiya, Amir F., "Regognition of Multiunit Neural Signals", *IEEE Trans. Biomed. Eng.*, vol. BME-39, pp. 723-729 (1992).

Bergman, Hagai, and DeLong, Mahlon R., "A Personal Computer-Based Spike Detector and Sorter: Implementation and Evaluation", *J. Neurosci. Methods* 41, pp. 187-197 (1992).

Primary Examiner—David M. Huntley
Assistant Examiner—A. Bodendorf
Attorney, Agent, or Firm—Townsend and Townsend Khourie and Crew; Larry Mendenhall

[57] ABSTRACT

An improved multi-unit analyzer is provided by virtue of the present invention. An analog-to-digital converter (A/D) digitizes a multi-unit signal, a pulse detector triggers when the multi-unit signal reaches a specified threshold, and a pulse sampler outputs a packet of samples of the signal around the point where the signal passes the threshold. The packet is then transformed into a point on a plane, the P-plane. The transformed point is compared to one or more rectangles in the P-plane, to determine if the point falls within any rectangle. If a point falls within a rectangle, a pulse is output on a line corresponding to the rectangle. This compare and output process is given a high priority. A low priority process displays the packet of samples in a window corresponding to the rectangle which encloses the point in the P-plane which results from the transformation of the packet of samples. A display also exists to display the points in the P-plane and the rectangles, thus allowing a user to view the relationship between the points and the rectangles. The points can be rotated to fit into the rectangles. The output pulses reflect the separation of multiple spikes of the multi-unit signal into individual single-unit signals.

11 Claims, 5 Drawing Sheets

SYSTEM AND METHOD FOR SEPARATING A MULTI-UNIT SIGNAL INTO SINGLE-UNIT SIGNALS

BACKGROUND OF THE INVENTION

The present invention relates to the field of neuron signal analysis, but is applicable to electromyograms and other applications where pulses from multiple sources need to be separated. More specifically, one embodiment of the present invention relates to solutions to the problem of separating a multi-unit, or composite, signal representing pulse trains from multiple neuron firings into single-unit signals each representing pulse trains from individual neurons.

Although problems of pulse train separation occur in a variety of fields, the problem occurs often in the tracking of neural signals. Because neurons interconnect in complex ways, the study of nervous system responses usually precludes the study of a single neuron. Often one or more electrical probes are placed in living tissue and neural electrical activity is captured. The signal is then processed in real-time or recorded for later processing. One signal per neuron is preferred, however such a signal is not always possible without disturbing the interconnections between the neurons. More typically, several pulse, or spike, trains from several neurons are detected by a probe, and processing of the probe signal requires separation of the multi-unit signal into single-unit signals.

Fortunately, spikes received by the probe from a particular neuron are similar in shape, while spikes received from different neurons are different in shape. This difference in shape allows spikes to be classified, or separated, into single-unit signals. As used herein, shape includes amplitude, so that two spikes which follow a similar line, but at different amplitudes, may be classified as spikes of different classes. Of course, due to noise and other factors, such as a close similarity in spike shape, separation is not perfect, and some spikes will be misclassified. Furthermore, separation is not trivial, since spikes from a single source might vary slightly in shape from time to time.

Before the present invention, several methods of signal separation were known in the art, however they provide insufficient user feedback, have a high cost, require complex computational requirements, or yield poor discrimination.

For example, U.S. Pat. No. 4,603,703, discloses a method for separation of spikes in a multi-unit signal which uses templates to classify spikes. According to that method, each spike is detected and compared against a set of sample spikes, or templates, and the spikes are classified according to which template, if any, matches the compared spike. The spikes matching a given template are then compiled into a component signal which is a reconstruction of the output of a single neuron.

Templates can be difficult to work with, however. If the separation is done digitally, considerable computation is required, and often the shape of a spike will fall between the shapes of two or more templates, so the spike will not be properly characterized. One problem with template matching systems is that the templates must be created before the separation begins, and they cannot be updated without interrupting the process of spike separation. The ability to update the templates while separation is on-going would allow a researcher to track the changes in shape of pulses from a particular neuron over time. Pulses from a neuron will change shape due to physiological effects or probe movement.

Another method of separation is discussed in an article by M. Abeles and M. Goldstein entitled "Multispike Train Analysis", *Proc IEEE*, vol 65, pp 762–773 (1977), which is incorporated herein for all purposes. Therein, a method of spike classification based on linear projection is disclosed. In the linear projection method, each spike is sampled and represented as a set of discrete values, in the form of a vector, corresponding to voltage samples at discrete moments in time. In a typical nervous system, 20–100 samples suffice to represent a spike, however less than 20 and more than 100 might be used depending on the bandwidth of the spikes and the frequency of spike occurrence. Thus, each spike is represented by a vector in an N-dimensional space, where N is the number of samples representing the spike.

To reduce the complexity of dealing with vectors in N dimensions, each vector is transformed into an alternate coordinate system which is defined by N orthonormal projection vectors. When a spike is projected onto each of the orthonormal vectors, the result is N inner products, or principal components (PC). These principal components define an N-dimensional vector in the alternate N-dimensional coordinate system, and the new vector equally well describes the original spike. The advantage to the alternate coordinate system is that the set of N orthonormal vectors can be selected such that the first two coordinates of a spike in the alternate coordinate system contain most of the variance from spike to spike. Thus, if the alternate coordinate system is properly selected, the difference vector between the original vector and a projection onto a plane, the P-plane, defined by the first two orthonormal vectors is minimized enough that, for the purposes of spike comparison, the original vectors are adequately represented by only two scalar values.

Only the first two orthonormal vectors need to be calculated, since the remaining vectors are never used. The first orthonormal vector is found by least squares fit of vectors representing a sample set of spikes, and the second orthonormal vector is found by a least squares fit of the differences of each vector in the sample set and its projection onto the first orthonormal vector, optimally leaving only a small error vector. Thus, the two orthonormal vectors defining the P-plane are chosen with reference to a sample set of spikes. Using a preset sample of spikes reduces the amount of computation required to generate the orthonormal vectors, but the error vectors will grow as the measured spikes vary statistically from the sample set.

Once the spikes are reduced to two-dimensional vectors, they can be displayed as points in the P-plane and viewed by a researcher on a planar display. Because spikes from a particular neuron have a common shape, the two vectors representing the spikes will be similar, and consequently, the corresponding points on the planar surface will be close together. Conversely, because spikes from different neurons have different shapes, the corresponding points in the P-plane for each of the spikes will be spaced far apart. Thus, points on the planar surface will tend to cluster, with each cluster indicating a different single-unit signal.

When the points are displayed on a visual display, such as a video graphics monitor, a researcher can easily identify the clusters of dots from single sources, or units, and indicate the associations among the dots. One method of associating points is for the researcher to interactively draw an ellipse around a cluster of points on the display, and have a processor associate the spikes represented by the points within the ellipse as being from one single-unit signal.

However, such an interactive system is very complex, computationally demanding, and therefore expensive to implement, as each point must be compared with the curved edge of an ellipse to determine if the point is within the bounds of an ellipse. Such a comparison involves trigonometric calculations, and such calculations require considerable computing power in a digital computer. Furthermore, the manipulation of ellipses by a user attempting to bound particular set of points is cumbersome, as it is difficult to visually determine which points would lie inside an ellipse until the ellipse is drawn and positioned.

While systems have been built which separate multi-unit signals, they have heretofore been extremely costly and require complex hardware. In light of the above drawbacks of existing systems for separation of component single-unit signals from a multi-unit composite signal, an improved multi-unit analyzer is needed.

SUMMARY OF THE INVENTION

An improved multi-unit analyzer is provided by virtue of the present invention.

In one embodiment of a multi-unit analyser, an analog-to-digital converter (A/D) digitizes the multi-unit signal. A pulse detector triggers when the multi-unit signal reaches a specified threshold, and a pulse sampler outputs a packet of samples of the signal around the point where the signal passes the threshold. The packet is then transformed into a point on a plane, the P-plane. The transformed point is compared to one or more rectangles in the P-plane, to determine if the point falls within any rectangle. If a point falls within a rectangle, a pulse is output on a line corresponding to the rectangle. This compare and output process is given a high priority. Other processes are performed in the system only if sufficient computing time is available without disturbing the high priority process. A low priority process displays the packet of samples in a window corresponding to the rectangle which encloses the point in the P-plane which results from the transformation of the packet of samples. A display also exists to display the points in the P-plane and the rectangles, thus allowing a user to view the relationship between the points and the rectangles.

Other embodiments further comprise a means for generating the coefficients of the transform matrix used to transform a packet of samples, where the coefficients are based on a collection of actual packets of samples, and where the matrix can be updated without interruption of the signal separation process.

Another embodiment comprises a user input means, whereby a user viewing the display can interactively adjust a predetermined trigger threshold, the number of samples in the packet of samples, the location of a triggering sample within the packet of samples, the rectangle bounds in the P-plane, and the rotation of the P-plane, all without interruption of the high priority signal separation process.

In one particular embodiment, the high and low priority processes are performed on a single personal computer, and a medium priority process is also implemented in the personal computer. The medium priority process handles the display of points in the P-plane and rectangle bounds. In this embodiment, the sampling, triggering, packeting, and transforming are performed on a digital signal processor board which communicates with the personal computer via a common memory and an interrupt scheme.

A further understanding of the nature and advantages of the inventions herein may be realized by reference to the remaining portions of the specification and the attached drawings.

DESCRIPTION OF THE PREFERRED EMBODIMENTS

This description describes an embodiment of the present invention as used in the separation of a multi-unit signal, i.e., a combination of spikes, or pulses, from multiple firings or multiple neurons, into single-unit signals in the form of pulses showing the time relationship between multiple firings of a single neuron. However, the present invention is not limited to such a signal source, and is used to separate signals from many other types of sources.

Throughout the drawings and the description below, the abbreviation "PC" refers to principal components, and does not refer to "personal computer", although some embodiments of the present invention use a personal computer. "Classes" refer to the categorization of points and spikes. Each class is defined by a rectangle. Spikes which have PC pairs (to be explained later) within a class' rectangle are assigned to that class. In a perfectly tuned system, all the spikes classified into a given class will be the result of repeated firings of a single neuron, and all the spikes from the neuron appear in that class.

Figure 1:
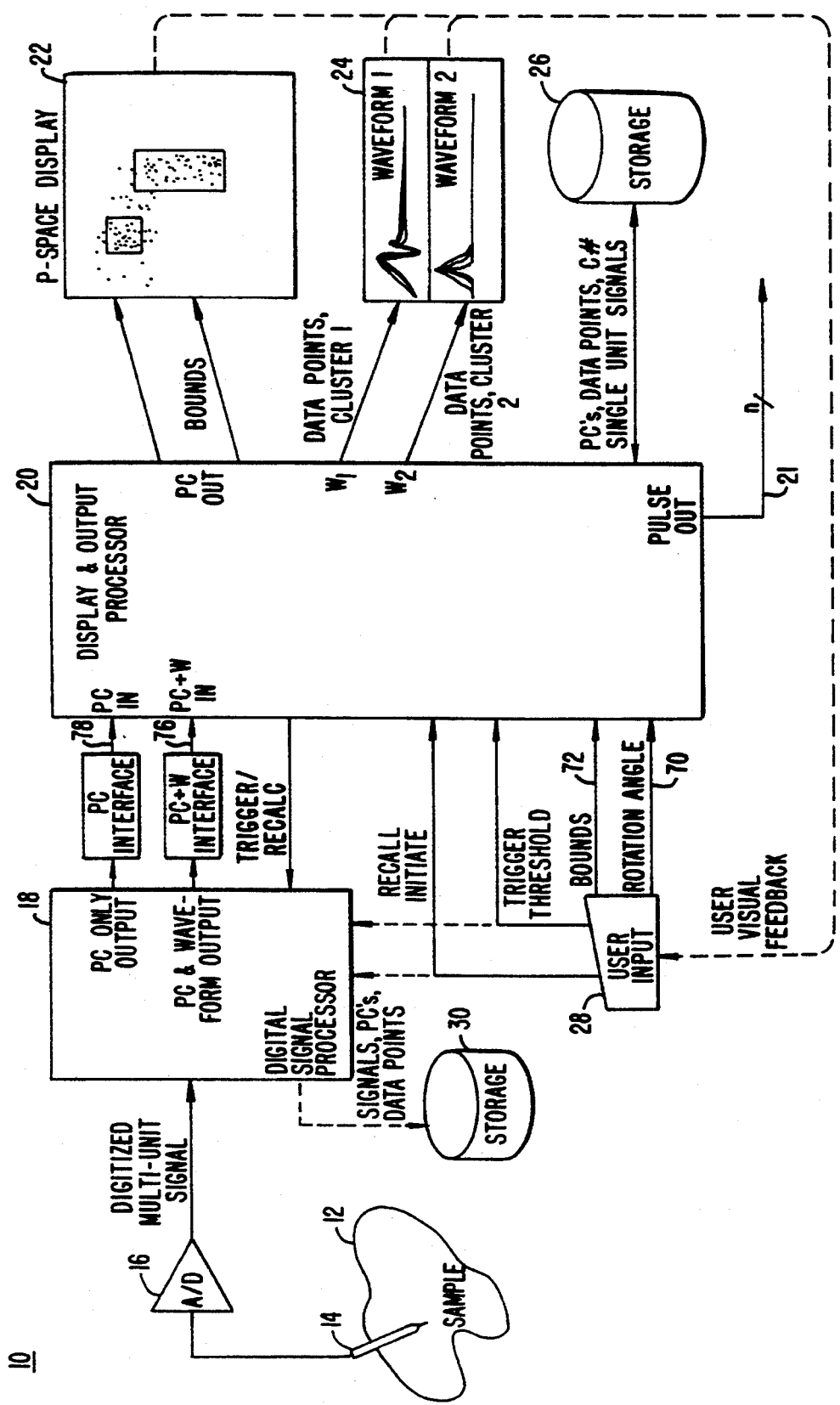
FIG. 1 is an overview of a multi-unit signal separating apparatus reading a multi-unit signal from a biological sample and outputting single-unit pulse signals, while allowing user interaction with the apparatus.

FIG. 1 shows an embodiment of a multi-unit analyzer 10 according to the present invention. A biological sample 12 produces a multi-unit signal, and the signal is picked up by a probe 14 and digitized by an analog-to-digital converter (A/D) 16. The digitized signal is then processed by a digital signal processor (DSP) 18. DSP 18 outputs data to a display and output processor 20 via a PC interface and a PC+W interface, which are further detailed below. DSP 18, in some embodiments, accepts input variables from an input device 28, while in other embodiments, the input variables for DSP 18 are routed through processor 20. In some embodiments, digitized signals and processed data are output to storage media (30) by DSP 18. Input variables include a recalculation initiate signal and a trigger threshold value.

The PC interface provides two scalar values, a pair of principal components, for each spike detected by a trigger routine in DSP 18. The PC pair is also provided at a second interface, the PC+W interface, along with the sampled waveform of the spike. Because the PC pair is included in the PC+W interface, the PC and PC+W interfaces can be serviced separately and asynchronously from each other. This allows the PC interface to be assigned a high priority, so that all PC pairs passed through the PC interface are processed by processor 20, while some spike data passed through the PC+W interface might be overwritten without being processed.

Processor 20 processes data received over the PC and PC+W interfaces, and also processes input from input device 28. Input device 28 supplies processor 20 with values defining rectangles in the P-plane (which define classes), rotation angles, and in some embodiments, DSP input variables. In one embodiment, the rotation angle is provided to DSP 18, and the PC pairs are rotated before reaching the PC and PC+W interfaces.

Processor 20 processes the PC pairs, the waveform data from the PC+W interface, and user inputs, to form several outputs. Single-unit signals are output on output lines 21, one class per line. PC pairs, once rotated, are plotted on a planar display 22, along with the bounds of the rectangles for each defined class. The samples from the PC+W interface are output as waveforms to a waveform display 24, which has a window for each class. In a particular embodiment, planar display 22 and waveform display 24 are windows themselves on a single monitor connected to processor 20 as a conventional personal computer graphics monitor.

PC pairs, waveforms, and single units signals can be saved to storage media 26, for later recall into processor 20 for post-processing or saved for later analysis by another system (not shown).

Figure 2:
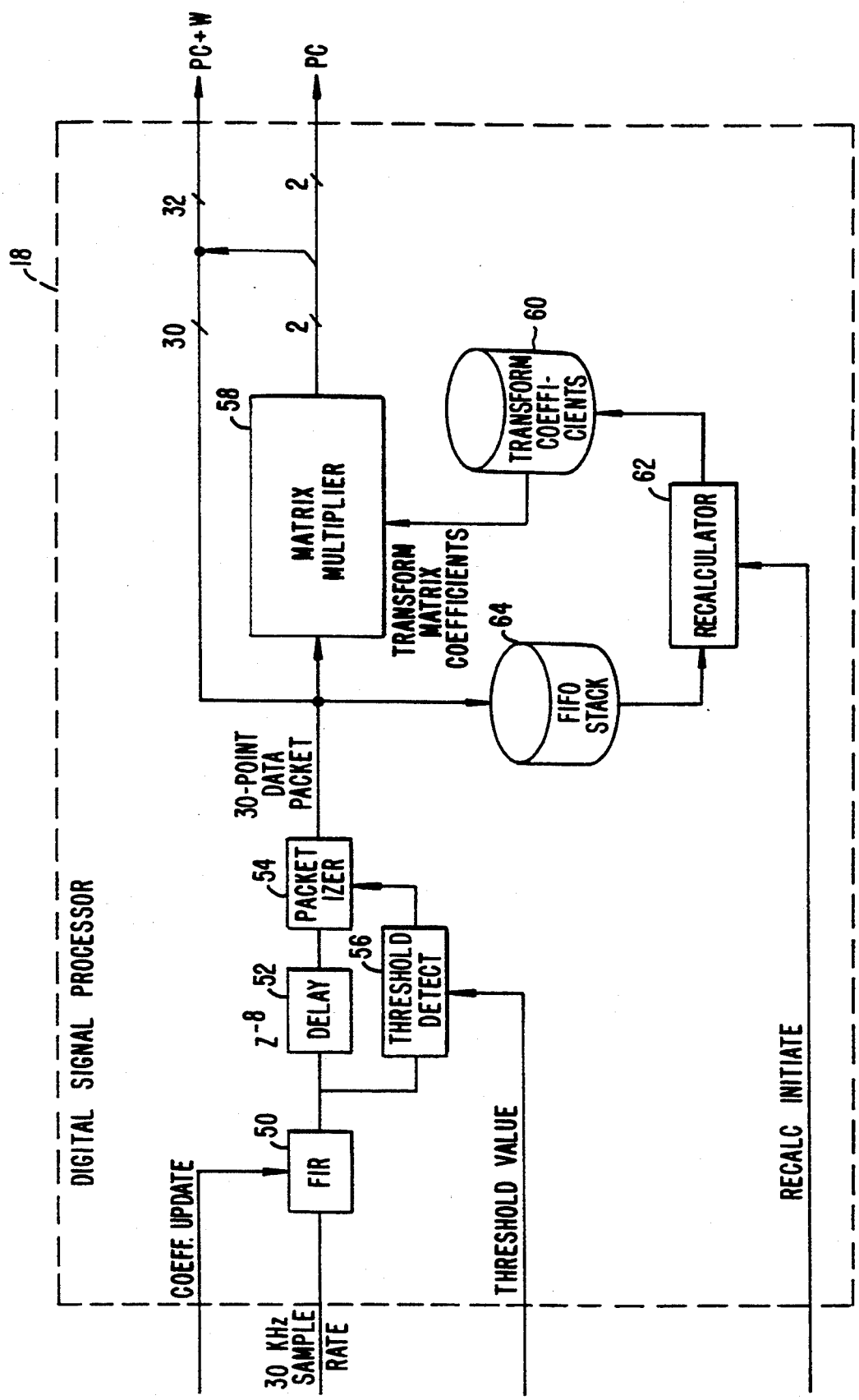
FIG. 2 is a more detailed block diagram of the digital signal processor shown in FIG. 1.

FIG. 2 shows, in more detail, DSP 18. The input from A/D 16 (shown in FIG. 1) is first filtered by a finite impulse response (FIR) filter 50. In some embodiments, filter coefficients of FIR filter 50 can be updated while analyzer 10 is in operation. The signal output by FIR filter 50 is delayed by a delay 52, and is monitored by a threshold detector 56. When threshold detector 56 is triggered, a packetizer 54 outputs a data packet of thirty samples, eight occurring before the triggering sample and twenty-one after the triggering sample, however other numbers of samples work are possible and may work equally well, depending on factors such as the bandwidth and resolution required to sample the spikes. The data packet is input to a matrix multiplier 58, which multiplies a vector formed of the data in the data packet and outputs the first two coefficients of the transformed vector as a PC pair. Alternately, the matrix multiplier 58 can be implemented as two thirty-stage digital filters. The transform coefficients for the transformation are stored in a coefficient storage location 60, and are optionally updated by a recalculator 62, which recalculates the coefficients from a sample set of data packets stored in FIFO stack 64 in response to a Recalculate Initiate signal being asserted.

Figure 3:
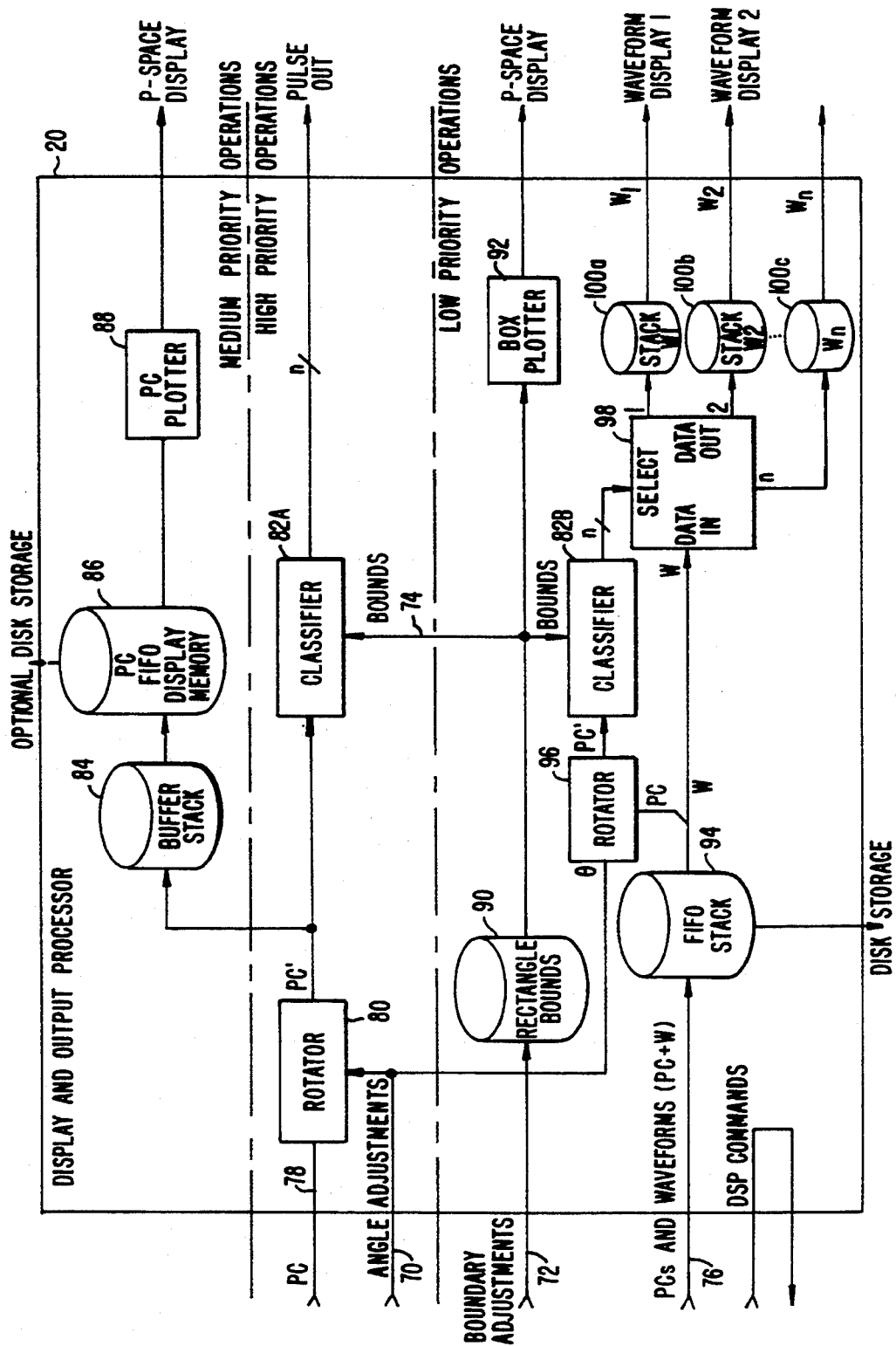
FIG. 3 is a more detailed block diagram of the display and output processor shown in FIG. 1.

FIG. 3 shows in greater detail processor 20. FIG. 3 shows the functions performed by processor 20, grouped according to the priority allotted to the function. The high priority operations include the rotation of a PC pair by rotator 80 according to an angle adjustment specified on a line 70, and a classification of the rotated PC pair by a classifier 82A according to rectangle bounds supplied on a line 74.

The medium priority operations are performed by PC plotter 88. The rotated PC pairs are buffered through buffer stack 84, which prevents the loss of data when high priority operations preempt the medium priority operations. Given enough time, rotated PC pairs loaded into PC FIFO memory 86, which holds the latest predetermined number of rotated PC values. PC plotter 88 then causes these predetermined number of points to be displayed on planar display 22. Optionally, data in PC FIFO memory 86 can be stored to disk.

In some embodiments, an additional process is provided whereby the points in PC FIFO memory 86 are rotated to remain aligned relative to the rotated PC pairs whenever the rotation angle is changed. However in the embodiment shown in FIG. 3, when the angle of rotation changes, only the PC pairs arriving after the angle change will be rotated by the new angle and the PC pairs previously stored in PC FIFO memory 86 will remain rotated by the old angle. Since the older PC pairs are overwritten eventually, after a time all the PC pairs in PC FIFO memory 86 will have been rotated by the new angle.

The low priority operations are performed only if sufficient computing power is available after the high and medium priority operations. Of course, each of the functions shown in FIG. 3 can be performed with specialized hardware or multiple parallel processors so that the low priority operations will always have enough time to execute, but the prioritization of functions allows lower-powered personal computers to be used, such as those based older microprocessors. The embodiment shown in FIG. 3, however, can easily be implemented on currently available microprocessor systems without any low priority operations being ignored.

The low priority operations include the display of rectangle boundaries on planar display 22 and the display of waveforms on waveform display 24. Boundary adjustments are provided on a line 72 to a boundary storage 90. Initially the boundary adjustments comprise all of the active rectangles, however it should be clear from FIG. 3, that continuous updating of boundary storage 90 is not necessary, and line 72 need only be used when the user requests that a boundary be moved. Rotation angle adjustments are provided to a rotator 96 on line 70. PC pairs and waveforms are provided to a FIFO stack 94 on line 76, which carries data from DSP 18 over the PC+W interface. Rotator 96 receives PC pairs from FIFO stack 94, and after rotating them, inputs them to classifier 82B.

The rotation of a PC pair is a conventional rotation of a two dimensional point in a Cartesian space, such as that defined by the following equations:

$$PC_1' = PC_1 \cos(\theta) + PC_2 \sin(\theta) \text{ and}$$

$$PC_2' = PC_1 \sin(\theta) + PC_2 \cos(\theta),$$

where ($PC_1$, $PC_2$) is the original PC pair, and ($PC_1'$, $PC_2'$) is the rotated PC pair rotated by an angle $\theta$. When displayed, $PC_1'$ is the horizontal, or x, coordinate, and $PC_2'$ is the vertical, or y, coordinate. Although not required, planar display 22 preferably displays the PC pair (0, 0) at the center of the display.

Classifier 96 identified the class to which a PC pair belongs, based on class rectangle bounds supplied on line 74, and asserts a signal on an output line corresponding to the identified class, if any. These outputs are coupled as inputs to a router 98. Router 98 passes a waveform packet at its Data In input to the Data Out output corresponding to the asserted Select line. The output waveforms are stored in the appropriate waveform stack 100A-C, and are output from there to waveform display 24. In some embodiments, stacks 100A–C are not needed due to the speed of the hardware used, and in some embodiments, classifier 82B outputs a value on a single line, the value indicating the matched class of a PC pair.

Figure 4:
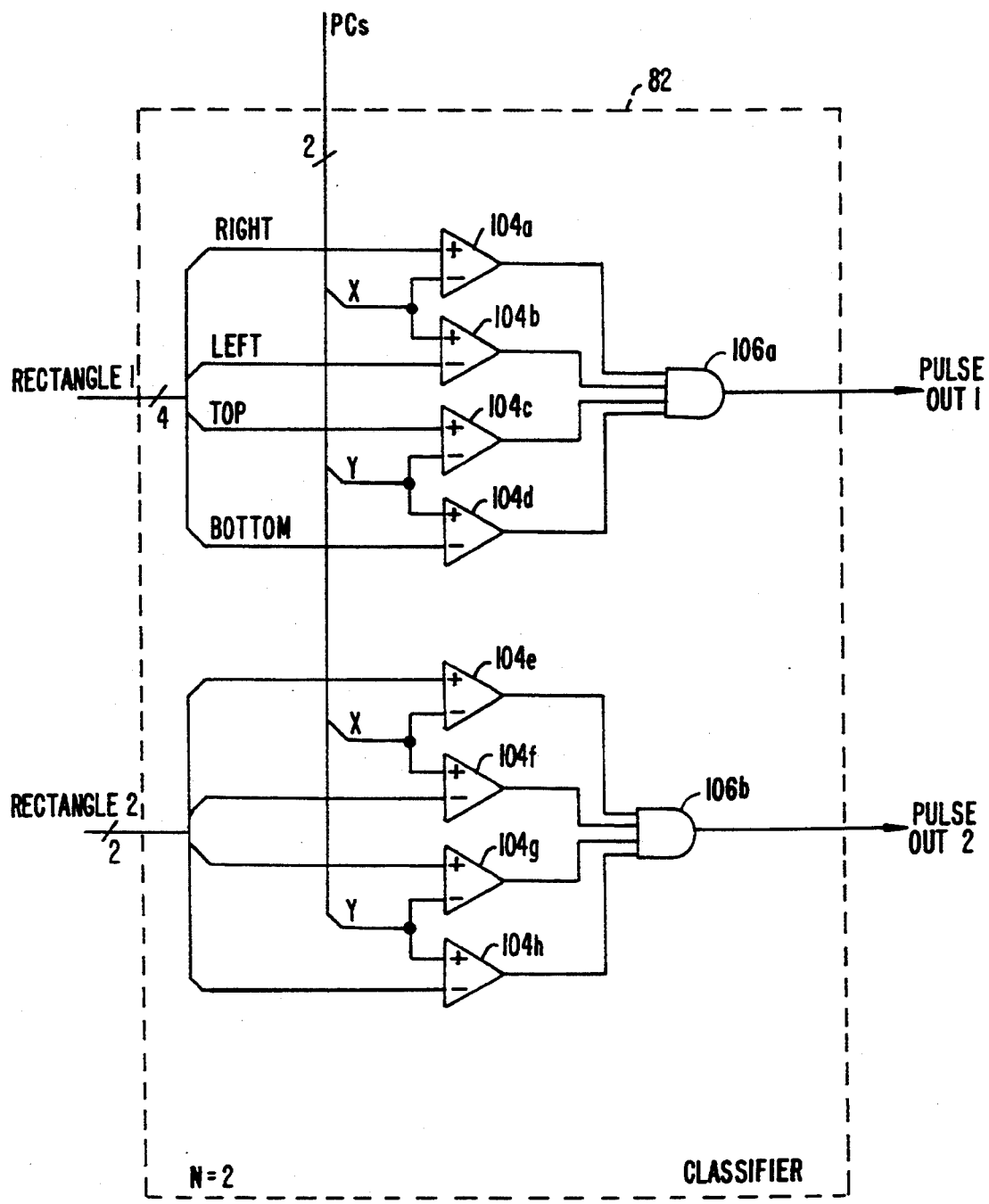
FIG. 4 is a more detailed block diagram of one of the classifiers shown in FIG. 3.

FIG. 4 shows the internal configuration of a classifier 82, of which classifiers 82A, 82B are examples. FIG. 4 shows a classifier which can compare a rotated PC pair against two rectangles, thereby identifying points in two classes, however classifier 82 is easily reconfigurable for other numbers of classes. The bounds of a first rectangle identifying points in Class 1 are applied to comparators 104A–D, which have outputs coupled to inputs of AND gate 106A, and the bounds of a second rectangle identifying points in Class 2 are applied to comparators 104E–H, which have outputs coupled to inputs of AND gate 106B. As shown in FIG. 4, AND gate 106A asserts a signal when all four of comparators 104A–D assert a signal, the gate 106A asserts a signal when the horizontal, or x, component of the rotated PC pair is between the right and left bounds of the rectangle for Class 1, and the vertical, or y, component of the rotated PC pair is between the top and bottom bounds of the rectangle for Class 1. Similarly, AND gate 106B asserts a signal when the rotated PC pair lies within the bounds of the rectangle for Class 2.

Figure 5:
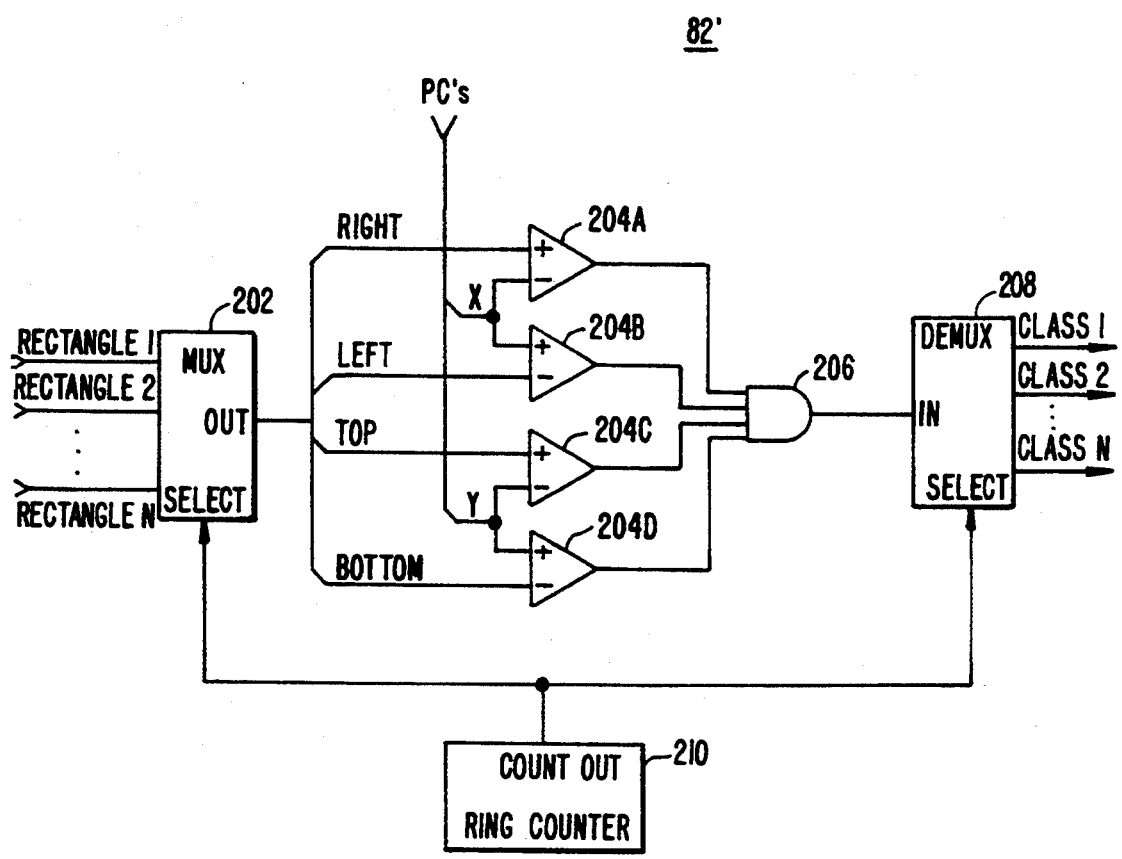
FIG. 5 is a block diagram of an alternate embodiment of a classifier.

FIG. 5 shows an alternate embodiment of classifier 82, namely classifier 82'. Instead of parallel processing the bounds, only one set of four comparators 204A–D is provided, along with one AND gate 206. The rectangle bounds are applied to comparators 204A–D one at a time by a multiplexer 202 and results are output one at a time, if at all, by a demultiplexer 208. The correspondence between the rectangle bounds selected and the output enabled is maintained by a ring counter 210, which outputs a counting signal and counts from one to N and repeats.

A typical operation of multi-unit analyser 10 will now be described. Initially, a threshold value, a rotation angle, and rectangle bounds are selected, or default values may be used. Other memory storage, such as coefficient storage location 60, may be preloaded with default data. Once the system is up and running, the user attaches probe 14 to biological sample 12. The multi-unit signal is sampled by A/D 16 and filtered by FIR filter 50. In some embodiments FIR filter 50 is not used, and matrix multiplier 58 performs any necessary filtering. The delay provided by delay 52 allows a data packet representing a sampling of a spike in the multi-unit signal to begin before the trigger threshold is reached. While the data need not be physically separated into 30 point packets, the logical separation into packets provides a clearer description of the operation of the multi-unit analyzer.

Each time the threshold is passed by a rising edge of the multi-unit signal, a data packet is created, but the signal must drop below the threshold before it can trigger again. For each data packet, a PC pair is calculated and output alone on the PC interface, and with the sampled data itself on the PC+W interface. While the PC pairs and the waveform data are being output, the transform coefficients can be updated by recalculator 62. While, in some embodiments, FIFO stack 64 is continually updated, if further processing power is needed by DSP 18, DSP 18 can be configured to store data to FIFO stack 64 only in response to a Recalculation Initiate signal, however this would slow the response time between the request for a recalculation and the updating of the transform coefficients as the data packets for sample spikes are collected. Of course, in either case, recalculation and the updating of the threshold value occur without interruption of the sampling of spikes and the output of data packets and PC pairs corresponding to those samples.

While the PC pairs are being rotated and classified at a high priority, the rotated PC pairs are also being displayed on planar display 22. Because the PC pairs are rotated before being classified or displayed, the rectangles can always be at right angles to the PC coordinate system without loss of versatility. With the rectangles at right angles, the classifier can use a simple four point comparison of the PC pair against the edges of the rectangle, which can be performed in parallel. By contrast, if the rectangles were rotated instead of the PC pairs, the test of whether a point is in the rectangle is much more difficult. As the rectangle bounds are updated, the bounds used by the classifiers change.

The user generally changes the bounds of the rectangles and the rotation angle after viewing the rectangles overlying the points on planar display 22. Typically, the user rotates the PC pairs so that clusters of points are separable by right-angle oriented rectangles, and then adjusts the rectangles so that they encompass separate clusters of points. If the separation is poor, the user can initiate a recalculation of the transform coefficients.

Waveform display 24 shows several spike waveforms, separated into difference windows according to the classification of the spike. If the several spikes displayed in a waveform window are poorly matched, the user can adjust the rectangles or the threshold value to improve the spike discrimination. In this way, by adjusting several variables, the user can assure that the separation of the multi-unit signal into the several single-unit signals is accurate. While the described embodiment outputs only a pulse on the single-unit output lines, in other embodiments, the waveform sample data is output on the single-unit lines. Also, other embodiments are possible where the adjustments are not provided by user feedback, but are provided by an automated feedback apparatus using pattern matching and other techniques to determine optimal threshold value, rectangle bounds, rotation angle, and transform coefficient recalculation times.

One embodiment of the multi-unit analyzer uses a DBCS-5332 A/D, a Communications Automation and Control DSP32C DSP board housed in an MS-DOS based personal computer, and a Metrabyte PIO12 board for outputting the separated signals. The DSP32C board is configured for two 30-point FIR filters and a sample rate of 30 kilohertz. The display processor displays P-plane points for the latest 128 spike sample packets and two rectangles, and displays the last three waveforms in each of two waveform windows. The display and output processor polls the DSP for new data at a 4 kilohertz rate. The apparatus of DSP 18 is implemented as software routines in a DSP assembly language, and the apparatus of processor 20 is implemented as software routines in the "C" language running on the MS-DOS based personal computer. The user input is supplied by a keyboard and/or a mouse, and the disk storage media is a conventional hard disk. The display is a high-resolution graphics monitor which implements both planar display 22 and waveform display 24 on different areas of the monitor.

The above description is illustrative and not restrictive. Many variations of the invention will become apparent to those of skill in the art upon review of this disclosure. Merely by way of example, more than two classes of spikes can be accommodated by increasing the number of rectangles displayed and the number of waveform windows, multiple multi-unit signals can be separated in parallel, and one or more multiple digital signal processors can be attached to one or more display and output processors. The scope of the invention should, therefore, be determined not with reference to the above description, but instead should be determined with reference to the appended claims along with their full scope of equivalents.

What is claimed is:

1. An apparatus for separating a multi-unit signal into single-unit signals, the multi-unit signal being a signal captured by a probe coupled to receive pulsed signals from a plurality of neurons, wherein the single-unit signals each represent pulse signals from one of the plurality of neurons and are separable by differences in shape between pulses from differing neurons, the apparatus comprising:
 an analog-to-digital (A/D) converter coupled to an output of the probe;
 a pulse sampler coupled to said pulse detector and said A/D output, which outputs a pulse data packet in response to the multi-unit signal in response to a predetermined threshold being reached;
 a transformation filter for transforming said pulse data packet into a principal component (PC) pair, said PC pair corresponding to a point on a P-plane, wherein each point on said P-plane is characterized by a coordinate on a first axis and a coordinate on a second axis;
 bounds storage means for storing rectangle boundaries, said rectangles characterized by rectangles within said P-plane with edges parallel to said first and second axes, wherein a rectangle is identifiable by a cluster number;
 rotation means coupled to said transformation filter and said bounds storage means, for rotating said PC pair on said P-plane by a predefined angle; and
 pulse output means coupled to said rotation means, for outputting a pulse on a single-unit output line corresponding to a rectangle which encloses said PC pair on said P-plane.

2. The apparatus of claim 1, further comprising:
 a display means coupled to said transformation filter and said bounds storage means, for displaying a dot on a two-dimensional display where coordinates of said dot correspond to values of said PC pair, and for displaying said rectangles; and
 a waveform display means coupled to said transformation filter and said bounds storage means, for displaying a waveform corresponding to a PC pair in one window of a plurality of windows, said one window corresponding to said rectangle which encloses said PC pair and said waveform corresponding to said pulse data packet from which said PC pair was transformed.

3. The apparatus of claim 1, wherein said display means and said waveform means are implemented by a single graphics monitor.

4. The apparatus of claim 1, wherein the apparatus is implemented in software routines performed by a general purpose computer.

5. The apparatus of claim 1, wherein the apparatus is implemented in digital logic gates.

6. The apparatus of claim 1, wherein the apparatus is implemented in a digital signal processor.

7. An apparatus for separating a multi-unit signal into single-unit signals, the multi-unit signal being a signal captured by a probe electromagnetically coupled to a plurality of neurons, wherein the single-unit signals each represent firing signals from individual neurons, the apparatus comprising:
 an analog-to-digital (A/D) converter coupled to an output of the probe;
 a pulse detector coupled to an output of said A/D, wherein said pulse detector outputs a detect signal in response to said multi-unit signal crossing a predetermined threshold;
 a pulse sampler coupled to said pulse detector and said A/D output, wherein said pulse sampler outputs pulse data packets comprising a predetermined number of samples of the multi-unit signal in response to said detect signal being asserted;
 a transformation filter for transforming data in said pulse data packets into a principal component (PC) pair for each transformed pulse data packet, said PC pair corresponding to a point on a P-plane, wherein each point on said P-plane is characterized by a coordinate on a first axis and a coordinate on a second axis;
 bounds storage means for storing rectangle boundaries, said rectangles characterized by rectangles within said P-plane with edges parallel to said first and second axes, wherein a rectangle is identifiable by a cluster number;
 a high priority processing means coupled to said transformation filter and said bounds storage means, for rotating said PC pair on said P-plane by a predefined angle, and for outputting a pulse on a single-unit output line corresponding to a rectangle which encloses said PC pair on said P-plane;
 a display means coupled to said transformation filter and said bounds storage means, for displaying a dot on a two-dimensional display where coordinates of said dot correspond to values of said PC pair, and for displaying said rectangles; and
 a low priority processing means coupled to said transformation filter and said bounds storage means, for rotating said PC pair on said P-plane by a predefined angle, and for displaying a pulse data packet corresponding to a PC pair in one window of a plurality of windows, said one window corresponding to said rectangle which encloses said PC pair.

8. A method for separating a multi-unit signal into single-unit signals, the multi-unit signal being a signal captured by a probe electromagnetically coupled to a plurality of neurons, wherein the single-unit signals each represent firing signals from individual neurons, comprising the steps of:
 digitizing an analog multi-unit signal into a digital signal;
 sampling said digital signal into data packets, a data packet representing a sampling of at least one spike;
 transforming a data packet into a principal component (PC) pair, said PC pair corresponding to a point on a P-plane, wherein each point on said P-plane is characterized by a coordinate on a first axis and a coordinate on a second axis;
 rotating said point in the P-plane by a predetermined angle to form a rotated point;

comparing said point on said P-plane with boundaries of a rectangle on said P-plane, said rectangle characterized by a rectangle within said P-plane with edges parallel to said first and second axes, each rectangle further characterized by an associated class number;

assigning a class number to said at least one spike according to a class number associated with a rectangle which encloses a rotated point derived from said spike; and outputting a pulse on a single-unit signal output line identified with said class number.

9. The method of claim 8, further comprising the steps of:

displaying said rotated point along with other rotated points;

displaying bounds of rectangles in relation to said rotated points;

accepting user input for adjustments to said bounds of rectangles;

accepting user input for adjustments to said predetermined angle; and displaying said adjustments to said bounds and said angle.

10. The method of claim 8, further comprising the step of adjusting transformation coefficients used in said step of transforming in response to a user command.

11. The method of claim 8, further comprising the step of displaying said sampling of at least one spike in one window of a plurality of windows where said one window is a window associated with said class number assigned to said at least one spike.

* * * * *